United States Patent
Chen et al.

(10) Patent No.: US 11,403,875 B2
(45) Date of Patent: Aug. 2, 2022

(54) PROCESSING METHOD OF LEARNING FACE RECOGNITION BY ARTIFICIAL INTELLIGENCE MODULE

(71) Applicant: ASKEY COMPUTER CORP., New Taipei (TW)

(72) Inventors: Chien-Fang Chen, New Taipei (TW); Setya Widyawan Prakosa, Jawa Timure (ID); Huan-Ruei Shiu, Taipei (TW); Chien-Ming Lee, Taoyuan (TW)

(73) Assignee: ASKEY COMPUTER CORP., New Taipei (TW)

( * ) Notice: Subject to any disclaimer, the term of this patent is extended or adjusted under 35 U.S.C. 154(b) by 99 days.

(21) Appl. No.: 17/100,587

(22) Filed: Nov. 20, 2020

(65) Prior Publication Data

US 2021/0200994 A1    Jul. 1, 2021

(30) Foreign Application Priority Data

Dec. 25, 2019  (TW) ................... 108147707

(51) Int. Cl.
*G06V 40/16* (2022.01)
*G06F 16/51* (2019.01)
*G06K 9/62* (2022.01)

(52) U.S. Cl.
CPC ............ *G06V 40/168* (2022.01); *G06F 16/51* (2019.01); *G06K 9/6262* (2013.01); *G06V 40/172* (2022.01)

(58) Field of Classification Search
CPC .... G06V 40/168; G06V 40/172; G06V 40/16; G06F 16/51; G06F 16/55; G06F 16/583;

(Continued)

(56) References Cited

U.S. PATENT DOCUMENTS 11,250,266 B2 *  2/2022  Ton-That ................. G07C 9/37
2010/0219936 A1 * 9/2010  Gabara ................... G10L 17/00
                                                    704/E15.001

(Continued)

FOREIGN PATENT DOCUMENTS

CA       3 084 855     * 7/2019
CN    106156688 A     11/2016

(Continued)

OTHER PUBLICATIONS

Mahmood et al. "Automatic player detection and identification for sports entertainment applications", Pattern Anal Applic (2015) 18:971-982 (Year: 2015).*

*Primary Examiner* — Qian Yang
(74) *Attorney, Agent, or Firm* — Muncy, Geissler, Olds & Lowe, P.C.

(57) ABSTRACT

A processing method of face recognition includes steps of: extracting embedding feature information from a face image; outputting a recognition result of face recognition according to the embedding feature information, wherein the recognition result includes a recognized name and embedding feature distance information; determining whether the recognized name is in a list or not; if the recognized name is in the list, performing a removal checking step for determining whether to remove the recognition result based on the embedding feature distance information; if determining that the recognition result is not to be removed, displaying the recognized name; if determining that the recognition result is to be removed, displaying a negative prompt; and dynamically and instantly providing a feedback and updating a recognition method for the face recognition.

18 Claims, 5 Drawing Sheets

(58) Field of Classification Search
CPC ... G06F 16/5866; G06K 9/6262; G06K 9/627
See application file for complete search history.

(56) References Cited

U.S. PATENT DOCUMENTS

| | | | | |
|---|---|---|---|---|
| 2011/0153341 A1* | 6/2011 | Diaz-Cortes | ........... | G16H 30/20 |
| | | | | 345/1.3 |
| 2013/0335314 A1* | 12/2013 | Chang | ................... | G06F 16/583 |
| | | | | 345/156 |
| 2015/0117786 A1* | 4/2015 | James | ..................... | G06T 5/005 |
| | | | | 382/195 |
| 2019/0042835 A1* | 2/2019 | Mostafa | .................. | G06F 21/32 |

FOREIGN PATENT DOCUMENTS

| | | | |
|---|---|---|---|
| CN | 106998444 | * | 2/2017 |
| TW | I512644 B | | 12/2015 |

* cited by examiner

PROCESSING METHOD OF LEARNING FACE RECOGNITION BY ARTIFICIAL INTELLIGENCE MODULE

CROSS REFERENCE TO RELATED APPLICATIONS

This Non-provisional application claims priority under 35 U.S.C. § 119(a) on Patent Application No(s). 108147707 filed in Taiwan, Republic of China on Dec. 25, 2019, the entire contents of which are hereby incorporated by reference.

BACKGROUND

Technology Field

The present disclosure relates to a face recognition technology.

Description of Related Art

The face recognition is a kind of biological feature recognition technology and, in particular, is a computer technology that analyzes and compares facial visual feature information for performing identification. Currently, the face recognition has been applied in many fields, such as access control management, mobile phone unlocking, identity authentication, and the likes. However, the face recognition system applied for multiple users (multiple faces) may still have recognition errors. The general face recognition system is a closed system, so that it is impossible or difficult for a common user to correct the recognition model or update the personal data. If a recognition error occurs to a face, the same recognition error will still occur in the next recognition of the same face. Although the conventional face recognition method can ensure safety, it causes inconvenience to use in the application situations with real-time demand.

SUMMARY

An objective of this disclosure is to provide a processing method of learning face recognition by AI (artificial intelligence) module and an electronic device performing the processing method that can allow the user to easily correct the errors and thus improve the accuracy of next recognition.

In one embodiment, a processing method of face recognition comprises steps of: extracting embedding feature information from a face image; outputting a recognition result of a face recognition according to the embedding feature information, wherein the recognition result comprises a recognized name and embedding feature distance information; determining whether the recognized name is in a list or not; if the recognized name is in the list, performing a removal checking step for determining whether to remove the recognition result based on the embedding feature distance information; if determining that the recognition result is not to be removed, displaying the recognized name; if determining that the recognition result is to be removed, displaying a negative prompt; and dynamically and instantly providing a feedback and updating a recognition method for the face recognition In one embodiment, the removal checking step comprises: determining whether the recognition result is ambiguous or not; if determining that the recognition result is ambiguous, providing a plurality of candidate names for a user to select a correct name therefrom; and if the correct name is different from the recognized name, updating a face information database according to the correct name and the embedding feature distance information.

In one embodiment, the embedding feature distance information comprises an embedding feature distance, and the step of determining whether the recognition result is ambiguous or not comprises: if the embedding feature distance is less than a low threshold value, determining that the recognition result is not to be removed; if the embedding feature distance is greater than a high threshold value, determining that the recognition result is to be removed, wherein the high threshold value is greater than the low threshold value; and if the embedding feature distance is between the low threshold value and the high threshold value, determining that the recognition result is ambiguous.

In one embodiment, the step of providing the plurality of the candidate names comprises: calculating all face embedding feature information stored in the face information database to obtain a plurality of face distance information; sorting the face distance information; selecting from the face distance information to obtain N sets of the face distance information with minimum distances as candidate distance information; voting names corresponding to the candidate distance information; and displaying a name voting result, wherein the name voting result comprises the candidate names.

In one embodiment, the step of updating the face information database comprises: removing a least approximate record with respect to the correct name from the face information database; and adding a new record with respect to the correct name to the face information database according to the embedding feature distance information.

In one embodiment, the removal checking step further comprises: if the correct name is identical to the recognized name, not updating the face information database and displaying the recognized name.

In one embodiment, the processing method further comprises a step of: if determining that the recognized name is not in the list, performing an update checking step for adding a name information to the list.

In one embodiment, a neural network of an AI module is used to extract the embedding feature information from the face image, and a classifier of the AI module is used to output the recognition result according to the embedding feature information.

In one embodiment, a processing method of face recognition comprises steps of: extracting embedding feature information from a face image; outputting a recognition result of a face recognition according to the embedding feature information, wherein the recognition result comprises a recognized name and embedding feature distance information; determining whether the recognized name is in a list or not; if determining that the recognized name is not in the list, performing an update checking step for adding a name information to the list; if the recognized name is in the list, performing a removal checking step for determining whether to remove the recognition result based on the embedding feature distance information; if determining that the recognition result is not to be removed, displaying the recognized name; if determining that the recognition result is to be removed, displaying a negative prompt; and dynamically and instantly providing a feedback and updating a recognition method for the face recognition. The removal checking step comprises: determining whether the recognition result is ambiguous or not; if determining that the recognition result is ambiguous, providing a plurality of candidate names for a user to select a correct name therefrom; if the correct name is identical to the recognized name, not updating a face information database and displaying the recognized name; and if the correct name is different from the recognized name, updating the face information database according to the correct name and the embedding feature distance information. The embedding feature distance information comprises an embedding feature distance, and the step of determining whether the recognition result is ambiguous or not comprises: if the embedding feature distance is less than a low threshold value, determining that the recognition result is not to be removed; if the embedding feature distance is greater than a high threshold value, determining that the recognition result is to be removed, wherein the high threshold value is greater than the low threshold value; and if the embedding feature distance is between the low threshold value and the high threshold value, determining that the recognition result is ambiguous. The step of providing the plurality of the candidate names comprises: calculating all face embedding feature information stored in the face information database to obtain a plurality of face distance information; sorting the face distance information; selecting from the face distance information to obtain N sets of the face distance information with minimum distances as candidate distance information; voting names corresponding to the candidate distance information; and displaying a name voting result, wherein the name voting result comprises the candidate names. The step of updating the face information database comprises: removing a least approximate record with respect to the correct name from the face information database; and adding a new record with respect to the correct name to the face information database according to the embedding feature distance information.

In one embodiment, an electronic device for performing a processing method of face recognition is provided.

As mentioned above, the processing method of face recognition and the electronic device of this disclosure allow the user to easily correct the errors and thus improve the accuracy of next recognition. Thus, this disclosure can be applied to the face recognition system applied for multiple users (multiple faces), which can add the face information instantly, and feedback to the recognition process, thereby improving the accuracy of next face recognition.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
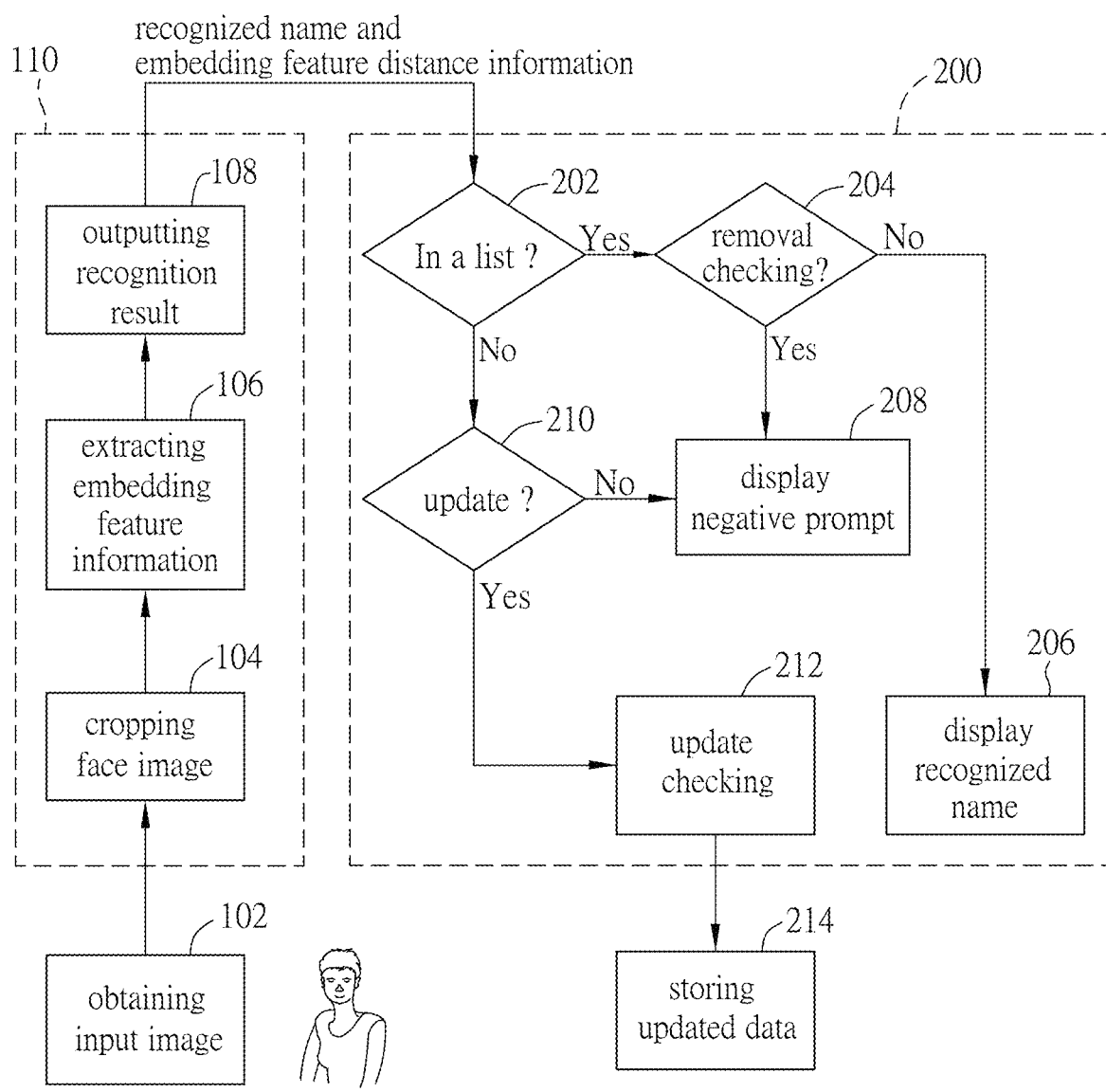
FIG. 1 is a flow chart of the processing method of face recognition according to an embodiment of this disclosure.

FIG. 1 is a flow chart of the processing method of face recognition according to an embodiment of this disclosure. Each block in FIG. 1 represents one step, and each step may further comprise several sub-steps. In this embodiment, the processing method of face recognition comprises the blocks 102~110 and the blocks 200~214. Referring to FIG. 1, the processing method of face recognition comprises the following steps of: obtaining an input image (block 102); detecting a face from the input image and cropping a face image (block 104); extracting embedding feature information from the face image (block 106); outputting a recognition result of a face recognition according to the embedding feature information, wherein the recognition result comprises a recognized name and embedding feature distance information (block 108); determining whether the recognized name is in a list or not (block 202); if the recognized name is in the list, performing a removal checking step for determining whether to remove the recognition result based on the embedding feature distance information (block 204); if determining that the recognition result is not to be removed, displaying the recognized name (block 206); if determining that the recognition result is to be removed, displaying a negative prompt (block 208); and if determining that the recognized name is not in the list, performing an update checking step for adding a name information to the list (block 212). In addition, before the block 208 and 212, the block 210 can be performed to query the user whether to update or not. If determining not to update, the block 208 is then performed; otherwise, if determining to update, the block 212 is then performed. The combination of the blocks 210, 212 and 214 as well as the block 204 can achieve the step of dynamically and instantly providing a feedback and updating a recognition method for the face recognition.

In the block 102, the image source can be from a camera or a communication device. In practice, the camera can take a photo of a user so as to generate the input image. The communication device can receive the image from any remote terminal, and the remote terminal can be installed with a camera for taking photos so as to generate the input image. In the block 104, a face detection is performed with the input image, thereby cropping the face part from the input image for the following face feature recognition.

Figure 2:
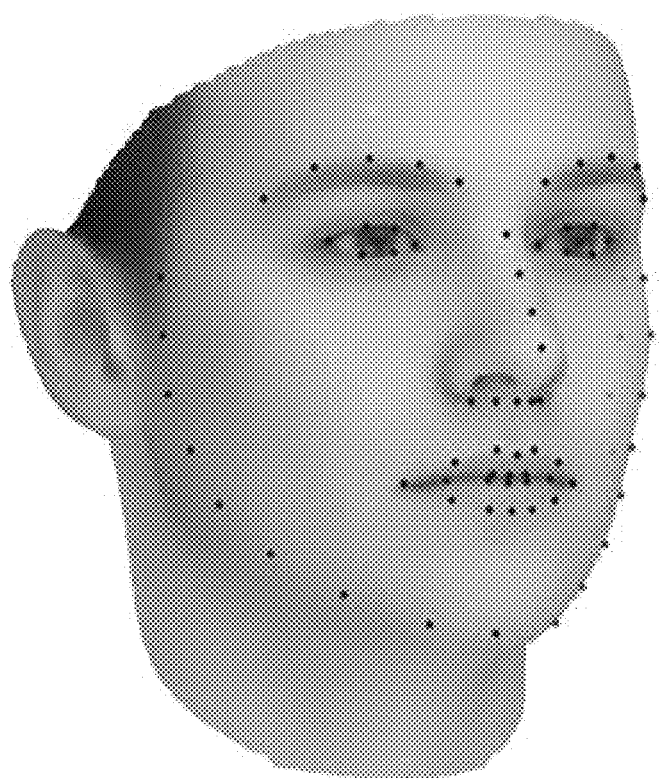
FIG. 2 is a schematic diagram showing the face embedding feature points.

The block 106 is performed to extract the embedding feature information from the face image. For example, as shown in FIG. 2, the embedding feature information comprises a plurality of embedding features, and the facial landmark extraction can mark the facial profile by multiple embedding features. The block 106 can be carried out by neural network, such as the neural network for deep learning. The amount of the embedding features can be, for example, 256 points, which can be calculated based on deep learning and L2 norm.

The block 108 is performed to calculate the Euclidean distance according to the embedding feature information of the input image and the embedding feature information of a face stored in a face information database. This calculation can be referred to the following equation (1). Afterwards, a classifier is provided to classify the embedding features based on the calculated Euclidean distance, and the result of the classifying can be used as the recognition result of the face recognition. The recognition result comprises a recognized name and embedding feature distance information. For example, the recognized name comprises one user, and the embedding feature distance information comprises the Euclidean distance between the embedding features of two face images (the input image and the face stored in the database).

$$\sqrt{\Sigma_{i=1}^{k}(x_i - y_i)^2} \qquad \text{Equation (1)}$$

k: amount of embedding features (e.g. 256 points);
Xi: features of input image; and
Yi: features of a face in the face information database.

The blocks 104 to 108 can be integrated in the block 110, and the block 110 can be performed by a single AI module. The AI module can be a chip, a program code, or a firmware including a chip and a program code. The blocks 202 to 212 can be integrated in the block 200, and the block 200 can be performed by a single computing device. The computing device comprises a processor and a memory. The processor is configured to execute the program code, and the memory is configured to store the program code and data. For example, the block 200 can be an application program of a mobile computing device. The neural network of the AI module can be applied to the block 106 for extracting the embedding feature information from the face image. The classifier of the AI module can be applied to the block 108 for outputting the recognition result according to the embedding feature information. The combination of the block 110 and the block 200 can implement the processing method of learning face recognition by AI module.

The block 202 is performed to determine whether the recognized name is in the list or not. In this embodiment, the names in the list indicate that the face information database comprises the face embedding feature information corresponding to the listed names, and the list can also be stored in the face information database.

When the recognized name is in the list, the block 204 is to perform a removal checking step for determining whether to remove the recognition result based on the embedding feature distance information. Accordingly, when the recognition result is wrong, this disclosure can provide a mechanism for the user to correct and feedback to the recognition procedure, thereby improving the accuracy of the next face recognition.

If determining that the recognition result is not to be removed, the block 206 is performed to display the recognized name, which means that the recognition result is correct.

If determining that the recognition result is to be removed, the block 208 is performed to display a negative prompt. For example, the negative prompt can be "Error!" or "Unknown" that indicates the recognition step or result is failed.

If determining that the recognized name is not in the list, the block 210 is performed to query the user whether to update or not. If the user decides not to update, the block 208 is performed to display the negative prompt. Otherwise, if the user decides to update, the block 212 is performed to perform an update checking step. The update checking step is to add a name information to the list, add a corresponding face embedding feature information to the face information database, and update the classifier model used in the block 108. The block 214 is to store the adopted classifier model in the block 108, so that the block 110 can recognize the newly added face (face embedding feature information) in the next face recognition and output the correct recognition result. In addition, the block 212 can also update the low threshold value T1 and the high threshold value T2 used in the block of FIG. 3.

Figure 3:
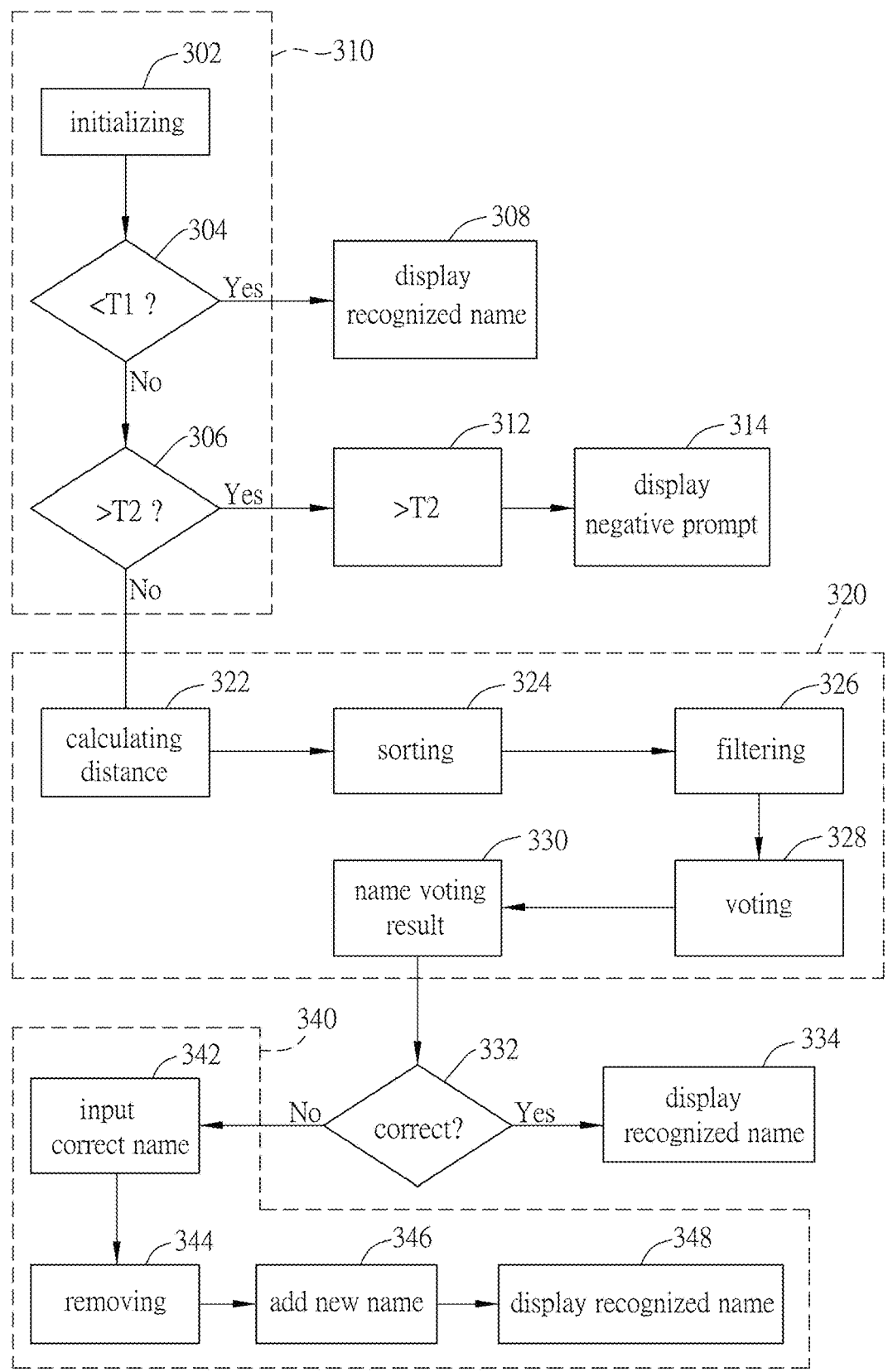
FIG. 3 is a flow chart showing the steps of the block of removal checking as shown in FIG. 1.

FIG. 3 is a flow chart showing the steps of the removal checking block 204 (removal checking step) as shown in FIG. 1. To be noted, each block in FIG. 3 represents one step, and each step may further comprise several sub-steps.

The removal checking block 204 comprises the following steps of: determining whether the recognition result is ambiguous or not (block 310); if determining that the recognition result is ambiguous, providing a plurality of candidate names for a user to select a correct name from the candidate names (block 320); if the correct name is identical to the recognized name, not updating the face information database and displaying the recognized name (block 334); and if the correct name is different from the recognized name, updating a face information database according to the correct name and the embedding feature distance information (block 340).

In the block 310, the embedding feature distance information comprises an embedding feature distance. The block 310 comprises blocks 302 to 306.

The block 302 is performed to obtain the embedding feature distance and then to initialize a low threshold value T1 and a high threshold value T2, wherein the high threshold value T2 is greater than the low threshold value T1.

The block 304 is performed to determine whether the embedding feature distance is less than the low threshold value T1 or not (block 304). If the embedding feature distance is less than the low threshold value T1, it determines that the recognition result is not to be removed and goes to the block 308. If the embedding feature distance is equal to or greater than the low threshold value T1, it goes to the block 306. The block 308 can be referred to the block 206 to display the recognized name.

Next, the block 306 is performed to determine whether the embedding feature distance is greater than the high threshold value T2, wherein the high threshold value T2 is greater than the low threshold value T1. If the embedding feature distance is greater than the high threshold value T2, the block 312 is performed to determine that the recognition result is to be removed. The block 314 can be referred to the block 208 to display the negative prompt. Otherwise, if the embedding feature distance is between the low threshold value T1 and the high threshold value T2, it determines that the recognition result is ambiguous and goes to the block 320.

In the block 320, the step of providing a plurality of candidate names comprises: calculating all face embedding feature information stored in the face information database to obtain a plurality of face distance information (block 322); sorting the face distance information (block 324); selecting from the face distance information to obtain N sets of the face distance information with minimum distances (closest faces) as candidate distance information (block 326), thereby filtering N sets of data; voting names corresponding to the candidate distance information (block 328); and displaying a name voting result, wherein the name voting result comprises the candidate names (block 330).

In the block 322, the Euclidean distance calculation is performed for the embedding feature information of the currently inputted face image and all or a plurality of the face embedding feature information stored in the face information database, thereby obtaining a plurality sets of face distance information corresponding to the face embedding feature information, respectively. In the block 322, a plurality sets of face distance information can be obtained.

In the block 324, the plurality sets of the face distance information are sorted from small to large (the closest to the farthest). In other words, the smaller distance is in the priority position.

In the blocks 326 to 330, for example, N is 10, including 5 sets of face distance information referring to name C, 3 sets of face distance information referring to name A, and 2 sets of face distance information referring to name B. The block 328 is to vote the names and to sort the names according to the voting result (e.g. the order of C(5), A(3), and B(2)). The block 330 is to display the names in the determined order (i.e. C, A, B), and the highest ranking name represents the optimum prediction result of recognition.

In the block 332, the user can determine whether the highest ranking name is correct or not according to the name voting result. If determining that the highest ranking name is correct, the user can select to not update and to accept the optimum prediction result to select the highest ranking name as the recognized name, and then it goes to the block 334. If not, it goes to the block 340.

The block 334 is not to update the face information database and not to update the classifier (model), thereby remaining the classifier model adopted in the block 108. In addition, the threshold values T1 and T2 are also not updated, and then it goes to the block 206 to display the recognized name.

In the block 340, the step of updating the face information database comprises: inputting a correct name by the user (block 342); removing a least approximate record with respect to the correct name from the face information database (block 344); adding a new record with respect to the correct name to the face information database according to the embedding feature distance information (block 346), wherein the newly added name (record) is used as the recognized name; and displaying the recognized name (block 348, referring to block 206).

In the block 342, the user can select one name from the candidate names as the correct name. The candidate names are collected from the list, and the user cannot select or add any name that is not in the list.

In the block 344, the face information database stores a plurality of embedding feature records, which are generated based on different face images of the same person (user). Each embedding feature record has a corresponding embedding feature distance. Among the embedding feature records, the embedding feature record with the largest embedding feature distance (farthest) is determined as the least approximate record, which is to be removed in this step (block 344). The missing record will be added back in the next step (block).

The block 346 is to add a new record with respect to the correct name to the face information database according to the embedding feature distance information of the input image, and to update the adopted classifier model in the block 108, so that the block 110 can recognize the newly added face (face embedding feature information) in the next face recognition and output the correct recognition result. In addition, the block 346 can also update the low threshold value T1 and the high threshold value T2.

Figure 4:
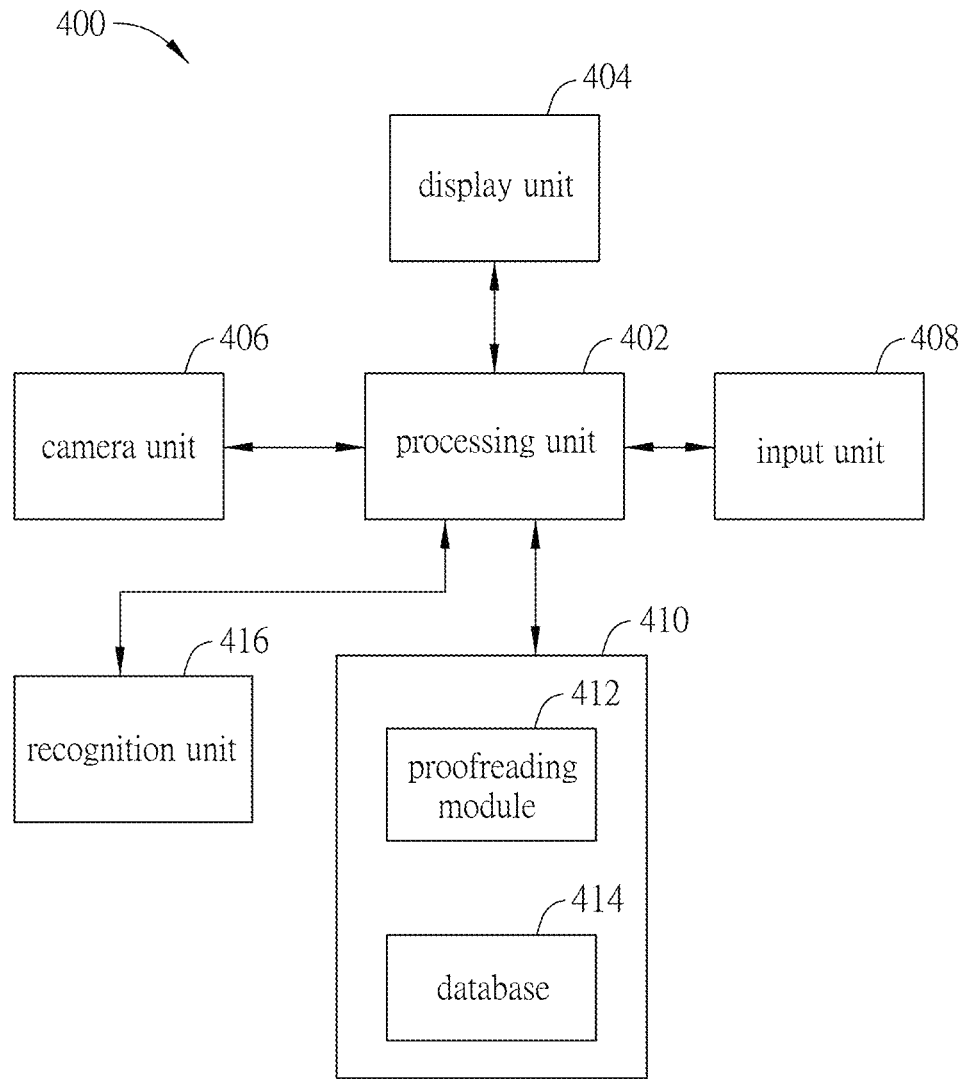
FIGS. 4 and 5 are block diagrams showing the electronic devices for performing the processing method of face recognition.
Figure 5:
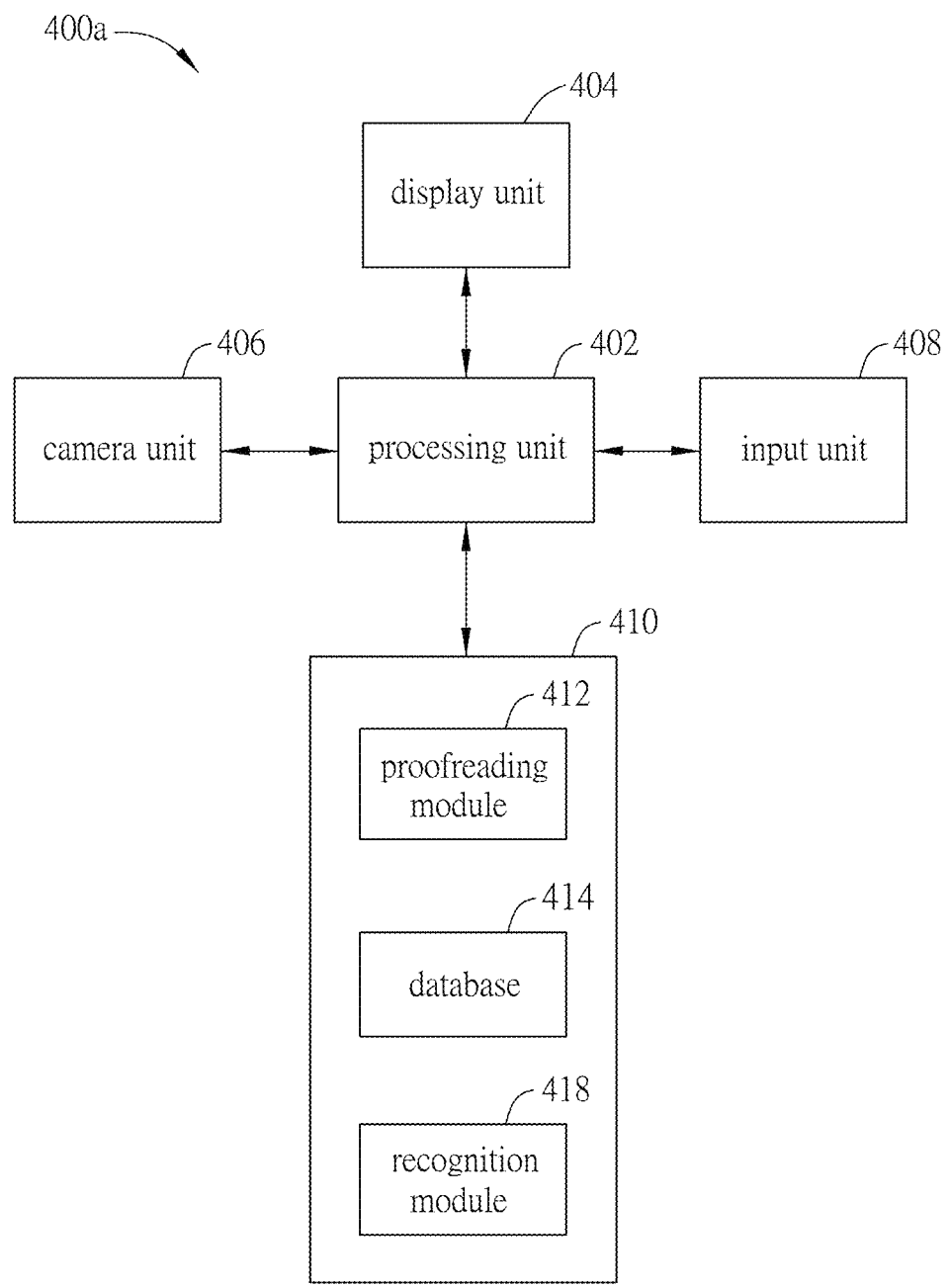

FIGS. 4 and 5 are block diagrams showing the electronic devices for performing the processing method of face recognition. As shown in FIG. 4, an electronic device 400, such as a computing device, comprises a processing unit 402, a display unit 404, a camera unit 406, an input unit 408, a memory unit 410, and a recognition unit 416. The processing unit 402 is coupled to the display unit 404, the camera unit 406, the input unit 408, the memory unit 410, and the recognition unit 416. The processing unit 402 is configured to execute a program code and/or program codes, and the program code(s) and related data can be stored in the memory unit 410. The block 200 of FIG. 1 and the blocks of FIG. 3 can be implemented by the program code(s) or the processing unit 402 executing the program code(s). For example, the memory unit 410 stores a proofreading module 412 and a face information database 414. The block 200 can be the proofreading module 412 stored in the memory unit 410. The proofreading module 412 comprises program codes and data. The camera unit 406 can implement the function of the block 102, and the recognition unit 416 can implement the function of the block 110 and can be a chip. The display unit 404 can comprise a display device for displaying the blocks or steps. The input unit 408 comprises an input element such as a touch panel or a keyboard, which is provide to the user, so that the user can provide input in the blocks or steps.

In addition, the recognition unit 416 of FIG. 4 can be replaced by the recognition module 418 stored in the memory unit 410 of FIG. 5. In the electronic device 400a of FIG. 5, the block 110 can be the recognition module 418 stored in the memory unit 410, and the recognition module 418 comprises program codes and data.

In summary, the processing method of face recognition and the electronic device of this disclosure allow the user to easily correct the errors and thus improve the accuracy of next recognition. Thus, this disclosure can be applied to the face recognition system applied for multiple users (multiple faces), which can add the face information instantly, and feedback to the recognition process, thereby improving the accuracy of next face recognition.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A processing method of face recognition, comprising steps of:
   extracting embedding feature information from a face image;
   outputting a recognition result of a face recognition according to the embedding feature information, wherein the recognition result comprises a recognized name and embedding feature distance information;
   determining whether the recognized name is in a list or not;
   if the recognized name is in the list, performing a removal checking step for determining whether to remove the recognition result based on the embedding feature distance information;
   if determining that the recognition result is not to be removed, displaying the recognized name;
   if determining that the recognition result is to be removed, displaying a negative prompt; and
   dynamically and instantly providing a feedback and updating a recognition method for the face recognition.

2. The processing method of claim 1, wherein the removal checking step comprises:
   determining whether the recognition result is ambiguous or not;
   if determining that the recognition result is ambiguous, providing a plurality of candidate names for a user to select a correct name therefrom; and
   if the correct name is different from the recognized name, updating a face information database according to the correct name and the embedding feature distance information.

3. The processing method of claim 2, wherein the embedding feature distance information comprises an embedding feature distance, and the step of determining whether the recognition result is ambiguous or not comprises:
    if the embedding feature distance is less than a low threshold value, determining that the recognition result is not to be removed;
    if the embedding feature distance is greater than a high threshold value, determining that the recognition result is to be removed, wherein the high threshold value is greater than the low threshold value; and
    if the embedding feature distance is between the low threshold value and the high threshold value, determining that the recognition result is ambiguous.

4. The processing method of claim 2, wherein the step of providing the plurality of the candidate names comprises:
    calculating all face embedding feature information stored in the face information database to obtain a plurality of face distance information;
    sorting the face distance information;
    selecting from the face distance information to obtain N sets of the face distance information with minimum distances as candidate distance information;
    voting names corresponding to the candidate distance information; and
    displaying a name voting result, wherein the name voting result comprises the candidate names.

5. The processing method of claim 2, wherein the step of updating the face information database comprises:
    removing a least approximate record with respect to the correct name from the face information database; and
    adding a new record with respect to the correct name to the face information database according to the embedding feature distance information.

6. The processing method of claim 2, wherein the removal checking step further comprising:
    if the correct name is identical to the recognized name, not updating the face information database and displaying the recognized name.

7. The processing method of claim 1, further comprising:
    if determining that the recognized name is not in the list, performing an update checking step for adding a name information to the list.

8. The processing method of claim 1, wherein a neural network of an AI module is used to extract the embedding feature information from the face image, and a classifier of the AI module is used to output the recognition result according to the embedding feature information.

9. A processing method of face recognition, comprising steps of:
    extracting embedding feature information from a face image;
    outputting a recognition result of a face recognition according to the embedding feature information, wherein the recognition result comprises a recognized name and embedding feature distance information;
    determining whether the recognized name is in a list or not;
    if determining that the recognized name is not in the list, performing an update checking step for adding a name information to the list;
    if the recognized name is in the list, performing a removal checking step for determining whether to remove the recognition result based on the embedding feature distance information;
    if determining that the recognition result is not to be removed, displaying the recognized name;
    if determining that the recognition result is to be removed, displaying a negative prompt; and
    dynamically and instantly providing a feedback and updating a recognition method for the face recognition;
    wherein, the removal checking step comprises:
    determining whether the recognition result is ambiguous or not;
    if determining that the recognition result is ambiguous, providing a plurality of candidate names for a user to select a correct name therefrom;
    if the correct name is identical to the recognized name, not updating a face information database and displaying the recognized name; and
    if the correct name is different from the recognized name, updating the face information database according to the correct name and the embedding feature distance information;
    wherein, the embedding feature distance information comprises an embedding feature distance, and the step of determining whether the recognition result is ambiguous or not comprises:
    if the embedding feature distance is less than a low threshold value, determining that the recognition result is not to be removed;
    if the embedding feature distance is greater than a high threshold value, determining that the recognition result is to be removed, wherein the high threshold value is greater than the low threshold value; and
    if the embedding feature distance is between the low threshold value and the high threshold value, determining that the recognition result is ambiguous;
    wherein, the step of providing the plurality of the candidate names comprises:
    calculating all face embedding feature information stored in the face information database to obtain a plurality of face distance information;
    sorting the face distance information;
    selecting from the face distance information to obtain N sets of the face distance information with minimum distances as candidate distance information;
    voting names corresponding to the candidate distance information; and
    displaying a name voting result, wherein the name voting result comprises the candidate names; and
    wherein, the step of updating the face information database comprises:
    removing a least approximate record with respect to the correct name from the face information database; and
    adding a new record with respect to the correct name to the face information database according to the embedding feature distance information.

10. The processing method of claim 9, wherein a neural network of an AI module is used to extract the embedding feature information from the face image, and a classifier of the AI module is used to output the recognition result according to the embedding feature information.

11. An electronic device for performing a processing method of face recognition,
    wherein the electronic device comprises steps of:
    extracting embedding feature information from a face image;
    outputting a recognition result of a face recognition according to the embedding feature information, wherein the recognition result comprises a recognized name and embedding feature distance information;
    determining whether the recognized name is in a list or not;

if the recognized name is in the list, performing a removal checking step for determining whether to remove the recognition result based on the embedding feature distance information;

if determining that the recognition result is not to be removed, displaying the recognized name;

if determining that the recognition result is to be removed, displaying a negative prompt; and dynamically and instantly providing a feedback and updating a recognition method for the face recognition.

12. The electronic device of claim 11, wherein the removal checking step comprises:

determining whether the recognition result is ambiguous or not;

if determining that the recognition result is ambiguous, providing a plurality of candidate names for a user to select a correct name therefrom; and if the correct name is different from the recognized name, updating a face information database according to the correct name and the embedding feature distance information.

13. The electronic device of claim 12, wherein the embedding feature distance information comprises an embedding feature distance, and the step of determining whether the recognition result is ambiguous or not comprises:

if the embedding feature distance is less than a low threshold value, determining that the recognition result is not to be removed;

if the embedding feature distance is greater than a high threshold value, determining that the recognition result is to be removed, wherein the high threshold value is greater than the low threshold value; and if the embedding feature distance is between the low threshold value and the high threshold value, determining that the recognition result is ambiguous.

14. The electronic device of claim 12, wherein the step of providing the plurality of the candidate names comprises:

calculating all face embedding feature information stored in the face information database to obtain a plurality of face distance information;

sorting the face distance information;

selecting from the face distance information to obtain N sets of the face distance information with minimum distances as candidate distance information;

voting names corresponding to the candidate distance information; and displaying a name voting result, wherein the name voting result comprises the candidate names.

15. The electronic device of claim 12, wherein the step of updating the face information database comprises:

removing a least approximate record with respect to the correct name from the face information database; and adding a new record with respect to the correct name to the face information database according to the embedding feature distance information.

16. The electronic device of claim 12, wherein the removal checking step further comprising:

if the correct name is identical to the recognized name, not updating the face information database and displaying the recognized name.

17. The electronic device of claim 11, wherein the processing method further comprises:

if determining that the recognized name is not in the list, performing an update checking step for adding a name information to the list.

18. The electronic device of claim 11, further comprising:

an AI module comprising a neural network for extracting the embedding feature information from the face image, and a classifier for outputting the recognition result according to the embedding feature information.

* * * * *